Dec. 3, 1957   J. HJORT   2,814,845

BELT CONNECTION

Filed Nov. 4, 1954

INVENTOR
JOHN HJORT

ATTORNEY

United States Patent Office 2,814,845
Patented Dec. 3, 1957

2,814,845
BELT CONNECTION

John Hjort, Auburn, Mass., assignor to Henry L. Hanson Company, Worcester, Mass., a partnership Application November 4, 1954, Serial No. 466,826

3 Claims. (Cl. 24—33)

This invention relates to new and improved connections or clip constructions for securing the ends of light belts to provide for continuous power transmission or driving belts for driving pulleys, shafts, spindles, etc., for relatively light construction.

The principal object of the present invention resides in the provision of a device as above described embodying a simple efficient clip or connection to take the place of conventional belt lacings, etc., and which provides for faster belt changes; and the provision of a belt clip or connection which is less expensive to manufacture and which provides for faster and easier application to the belt; and the provision of the new belt connection including a novel means for securing the clip to the ends of the belt, the latter being preferably of light woven material in the form of a tape, the same being folded upon itself at its ends over certain portions of the new connection, and being impregnated throughout the connection area with rubber or any other material, to the end that the belt connection is made much stronger and provides notably thick terminal belt portions which taper down from the novel belt connection to the thickness of the belt itself, the connection being prevented from contacting the pulley or other device with which it is used.

Another object of the invention resides in the provision of a belt connection comprising the tape ends described wherein each tape end receives and permanently holds a generally rectangular closed wire loop by one side run thereof so that another parallel side run is exposed beyond the tape end, said tape being capable of having its ends juxtaposed at the job about the pulley, spindle, or whirl to be driven, by the machine operator, and including a light, easily bent clip of novel shape having a pair of edge flanges manually insertable between the respective exposed side runs of the wire loops, said flanges being parts of a connecting web, preferably concaved parallel to the flanges for better holding, whereby the machine operator may merely bend the flanges toward each other over the exposed side runs of the wire loops by means of pliers, connecting the belt ends together and providing the driving belt in it.

Other objects and advantages of the invention will appear hereinafter.

Reference it to be had to the accompanying drawings, in which

Figure 5:
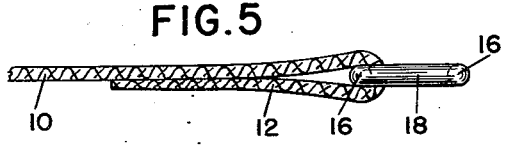
Fig. 5 is an edge view showing the belt and part of the connection prior to impregnation.

The present belt may be made of any material desired, but it is preferred that this material shall be capable of being impregnated by a rubber or other material. The invention is illustrated as comprising a belt 10 which may be in the form of a light canvas tape or the like, which is to have its ends connected to form a continuous belt. In the present instance the terminal end portions 12 of the belt are folded back over or under the main body portion 10 of the belt. Included within the folds there may be ferrules 14, the ferrules being open ended at the lateral side edges of the belt, but in some cases the ferrule is omitted as in Fig. 5.

Whether the ferrules are present or not, a continuous wire loop of generally rectangular form is enclosed in the belt end folds 12 by one side run 16, leaving a side run 18 exposed and spaced from the fold or belt end.

Figure 1:
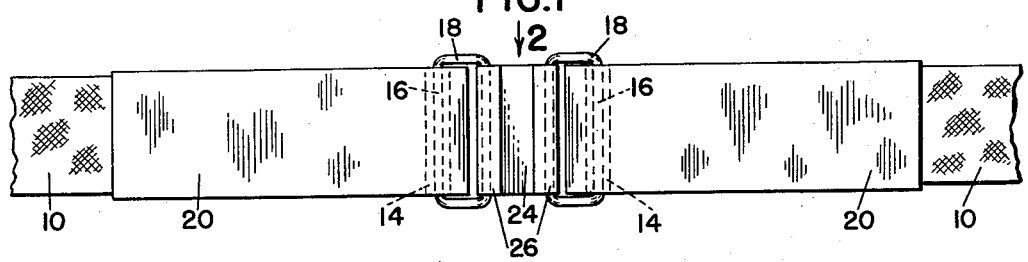
Fig. 1 is a view in elevation showing the complete belt connection.
Figure 2:
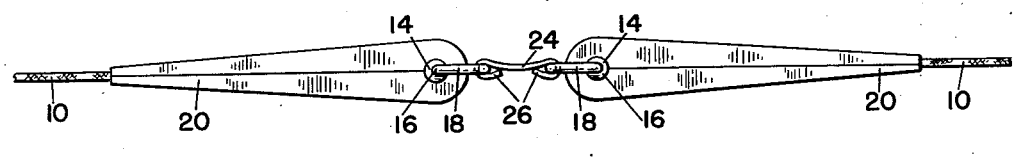
Fig. 2 is an edge view thereof looking in the direction of arrow 2, in Fig. 1.

With the parts in this position the terminal portions of the belt are impregnated with a rubbery material under conditions of heat and pressure, and this material is forced directly through the belt 10 and the fold 12 thus making each end including the wire loop, and the ferrule if present, a unitary solid member preferably tapering as illustrated in Fig. 2 at 20.

Figure 3:
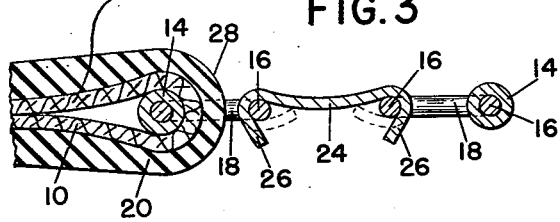
Fig. 3 is an enlarged longitudinal section through the connection, parts being omitted.
Figure 4:
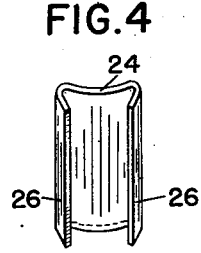
Fig. 4 is a perspective view of the clip prior to application to the connection.

The loops are connected together at any time, either originally or at the machine where the belt to be used, by a novel clip best shown in Figs. 3 and 4. This clip comprises a web or plate 24 of small size, having parallel flanges 26 at its edges. These flanges turn in slightly, see Fig. 3 in solid lines, but are quickly and easily inserted between the exposed side rim 18 and the adjacent rubber end material at 28. Then the operator merely takes a pair of pliers and crimps the turned in flanges over the rims 18 of the wire loops to the dotted line position in Fig. 3, and the belt is ready for use.

It is preferred that the web or plate 24 shall be concaved parallel to the longitudinal extent of the flanges not only to strengthen the clip but to conform to the wire loops and prevent any possible looseness. This invention provides a very simple, inexpensive, light belt connection for light belts, which is easily connectable with tools at hand on the job. The time required to change belts is greatly decreased by this invention, and this results in increased production time of any machine on which it is used.

As so far described, the ends of the belt have been prepared for connection and this is simply and easily done by inserting flanges 26 into the corresponding openings and this quickly and easily connects the ends of the belt together. Each staple is of U-shape having a pair of legs extending into the ferrules.

It is preferred that each ferrule shall be crimped to form an inwardly extending neck or ridge 22 and cooperating with this restriction the legs of the U-shaped staples may be bent as at 24 so that they snap past the restriction and form a more permanent connection, which nevertheless is easily detached with a pair of pliers.

The stresses applied to the belt during the use thereof are clearly at right angles to the ferrules and there is little or no tendency for the staples to escape, but in any event the crimped construction illustrated in Fig. 4 prevents any accidental removal of the staples from the ferrules.

It will be seen that this invention provides not only a novel belt connection but also a new and improved transmission belt which is stronger and longer lasting, forming shoulders adjacent the connection preventing the latter from damaging its pulley, or vice versa.

Reference is made to my copending application, Serial No. 355,960, filed May 19, 1953, now Patent No. 2,727,399, dated December 20, 1955, for additional advantages derived from impregnation and enlargement of the ends of the belt.

Having thus described my invention and the advantages thereof, I do not wish to be limited to the details herein disclosed, otherwise than as set forth in the claims, but what I claim is:

1. A connecting construction for light weight belts comprising means at each end of the belt to hold a loop and a loop in each said means, each loop having an exposed side run, a bendable clip to connect the side runs together, the clip including a pair of bent edges each of which is insertable under a separate side run of the respective loops and is capable of being bent over upon the same, said loop holding means comprising end portions of the belt folded over upon the belt and secured thereto, another side run of each loop being enclosed in a respective folded over secured end portion, and belt impregnating material applied to and through the belt at the folded over part, said material being thick enough to extend beyond the sides of the belt a greater distance than any part of the belt connection and gradually tapering down to the belt side surfaces.

2. A belt connection for a belt having its ends folded over upon itself and impregnated at the folded over belt ends and built up gradually to a relatively thicker tapered portion by the impregnating material, a pair of wire loops each including a pair of connected spaced side runs with one side run held in the fold at each end of the belt and the other side run exposed, and a bendable clip, a flange at each opposite edges of the clip, each flange being inserted under an exposed loop side run so that the flanges project through the loops and the clip is located at one side only thereof, said flanges being toed in partly over the said exposed side runs and in position to be easily bent down over the same while allowing for easy insertion of the clip to connect the exposed loop side runs.

3. A belt connection for a belt having its ends folded over upon itself and impregnated at the folded over belt ends and built up gradually to a relatively thicker tapered portion by the impregnating material, a pair of wire loops each including a pair of connected spaced side runs with one side run held in the fold at each end of the belt and the other side run exposed, and a removable bendable clip, a flange at each opposite edge of the clip, said flanges being inclined toward each other and the clip being concave between the flanges, each flange being inserted under an exposed loop side run so that the flanges project through the loops and the clip is located at one side only thereof with the concave portion thereof between and closely adjacent the said exposed side runs and conforming in shape thereto to partially embrace the same, said flanges being toed in partly over the said exposed side runs and in position to be easily bent down over the same while allowing for easy insertion of the clip to connect the exposed loop side runs.

References Cited in the file of this patent

FOREIGN PATENTS

| | | |
|---|---|---|
| 12,598 | Great Britain | 1909 |
| 309,783 | Great Britain | Apr. 18, 1929 |
| 331,032 | Germany | Dec. 28, 1920 |
| 662,042 | Germany | July 2, 1938 |